United States Patent [19]
Lipshield

[11] 4,114,718
[45] Sep. 19, 1978

[54] LOCKING HOOK AND PIN APPARATUS FOR LOCKING TOGETHER A PAIR OF COMPONENTS

[75] Inventor: Eugene C. Lipshield, Moberly, Mo.

[73] Assignee: Orscheln Brake Lever Mfg. Company, Moberly, Mo.

[21] Appl. No.: 758,914

[22] Filed: Jan. 17, 1977

[51] Int. Cl.$^2$ .............................................. B62D 27/06
[52] U.S. Cl. ................................ 180/89.14; 292/111; 296/35 A
[58] Field of Search ............... 180/89.14, 89.15, 89.18; 296/28 C, 35 R, 35 A; 292/99, 110, 111; 298/23 M

[56] References Cited

U.S. PATENT DOCUMENTS

| | | | |
|---|---|---|---|
| 2,740,487 | 4/1956 | Murty | 180/89.14 |
| 2,943,693 | 7/1960 | Norrie | 180/89.14 |
| 3,279,559 | 10/1966 | Hirst, Jr. | 180/89.14 |
| 3,497,257 | 2/1970 | Hirst | 296/35 R |
| 3,581,840 | 6/1971 | Hirst, Jr. | 180/89.14 |
| 3,797,882 | 3/1974 | Brimhall | 296/28 C |
| 3,841,693 | 10/1974 | Reynolds | 180/89.15 X |

Primary Examiner—Joseph F. Peters, Jr.
Assistant Examiner—Terrance L. Siemens
Attorney, Agent, or Firm—Lawrence E. Laubscher

[57] ABSTRACT

An improved locking device of the hook and transverse pin type is disclosed for locking together a pair of components, characterized by the provision of a cam member that is displaceable by linearly operable cam operating means to operate a hook member between locked, safety and fully released positions relative to a locking pin member. In one embodiment, the cam member is linearly displaceable throughout its entire length of travel between locking, safety and releasing positions by the cam operating means, and in a second embodiment, the cam member is pivotally displaceable between the locking and safety positions, and linearly displaceable between the safety and releasing positions. A pawl device may be provided for normally locking the cam member in its releasing position when the pin and hook housings are separated, said pawl device being operable to its unlocked condition when the pin and hook housings are returned to their adjacent contiguous position.

16 Claims, 12 Drawing Figures

1

LOCKING HOOK AND PIN APPARATUS FOR LOCKING TOGETHER A PAIR OF COMPONENTS

BRIEF DESCRIPTION OF THE PRIOR ART

In the prior Hirst U.S. Pat. Nos. 3,279,559 and 3,497,257 and the Hirst et al. U.S. Pat. No. 3,581,840 — each of which is assigned to the same assignee as the present invention — locking mechanisms of the hook and transverse pin type are disclosed for locking together a pair of components, such as the tilt cab and chassis components of a motor vehicle.

In these prior locking mechanisms, the hook member is connected with the hook housing by a connecting link which causes the hook member to be initially axially displaced from the locked position to a safety position in which the hook portion of the hook member is spaced from the locking pin, and to be subsequently pivoted toward a fully released position relative to the locking pin. While these prior mechanisms generally operate satisfactorily, they require a relatively large number of parts, are somewhat difficult to assemble, and are relatively expensive to manufacture. Furthermore, the actuator means for operating the hook member are often subjected, during operation, to undesirable lateral loading effects which have a deleterious effect on the actuator means as well as on the hook mechanism, especially in the event that the hook member has a jammed condition when the tilt cab member is not fully seated on the chassis member.

SUMMARY OF THE INVENTION

The present invention was developed to provide an improved positive-acting locking device that requires fewer moving parts, is easier to assemble, and has a lower manufacturing cost.

In accordance with a primary object of the invention, cam means are provided which are displaced by linearly operable cam operating means between locking, safety and releasing positions relative to the hook housing, thereby to operate the hook member between its locked, safety and released positions, respectively. In one embodiment, the cam member is linearly displaced completely throughout its length of travel between the locking, safety and releasing positions, while in a second embodiment, the cam member is pivotally displaced between the locking and safety positions, and is linearly displaced between the safety and releasing positions.

According to another feature of the invention, pawl means are provided for locking the cam member in its releasing position when the pin and hook housings are separated. The pawl means are preferably so arranged that when the pin and hook housings are returned to their adjacent contiguous positions, the pawl means is automatically operable to its unlocked condition. To assure proper alignment between the housings when in their seated condition, the adjacent surfaces of the housings may be provided with mating male and female configurations, respectively.

In accordance with a more specific object of the invention, in the first embodiment, the hook member is connected with a a stationary pivot pin on the hook housing by axially-extending slot means contained in the hook member, first spring means being provided for axially biasing the hook member toward the safety position, and for pivotally biasing said hook member in the direction of the locking pin. The linearly displaceable cam means is operable from a releasing position toward a locking position against the biasing force of second spring means, a first cam surface on the cam member and a first cam follower on the hook member being provided for effecting axial displacement of the hook member from the safety position to the locked position as the cam member is linearly displaced toward the locking position. When the cam member is initially displaced from the locking position toward the releasing position, the hook member is axially displaced to the safety position, and upon further displacement of the cam member in the releasing direction, a second cam follower on the cam member engages a second cam surface on the hook member to pivot the hook member to the fully released position.

In accordance with a further object of the invention, in the first embodiment the cam member comprises a cam plate having an opposed pair of edges parallel with the axis of linear displacement of the cam member, stationary support surfaces being provided on the hook housing which engage the aforementioned edges of the cam plate to positively guide the same throughout its length of linear displacement, thereby to prevent the actuator means for the cam plate from being subjected to undesirable lateral load forces during operation. In one modification, the cam plate actuator means comprises hydraulic piston and cylinder motor means, while in an second modification, the actuator means comprises manually operable lever-cable means affording a mechanical advantage.

In accordance with another object of the invention, in the second embodiment the hook member is pivotally connected with the cam member, said cam member including a first cam surface which cooperates with a stationary cam follower on the hook housing to pivot the cam member from the locking position to the safety position when the linearly operable cam operating means initially applies force to the cam member, said cam member including a second cam surface which engages the cam follower to maintain the same in its pivoted condition during linear displacement of the cam member from its safety position toward its releasing position. Spring means normally bias the cam member away from its releasing position, said cam member having a third cam surface which cooperates with the hook member pivot pin to pivot the cam member from its safety position toward its locking position.

The present invention has utility in such applications as the locking together of the cab and chassis components of a tilt cab vehicle, as tail-gate locking means, vehicle aerial bucket locking means, boom hold-down means for a vehicle in transit, antirotation means for crane and scraper blade turntables, a tilt bed lock for tilt bed truck and trailer beds, a latch for attaching implements to a tractor, and power unlatching and locking means for a typical pintle hook.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
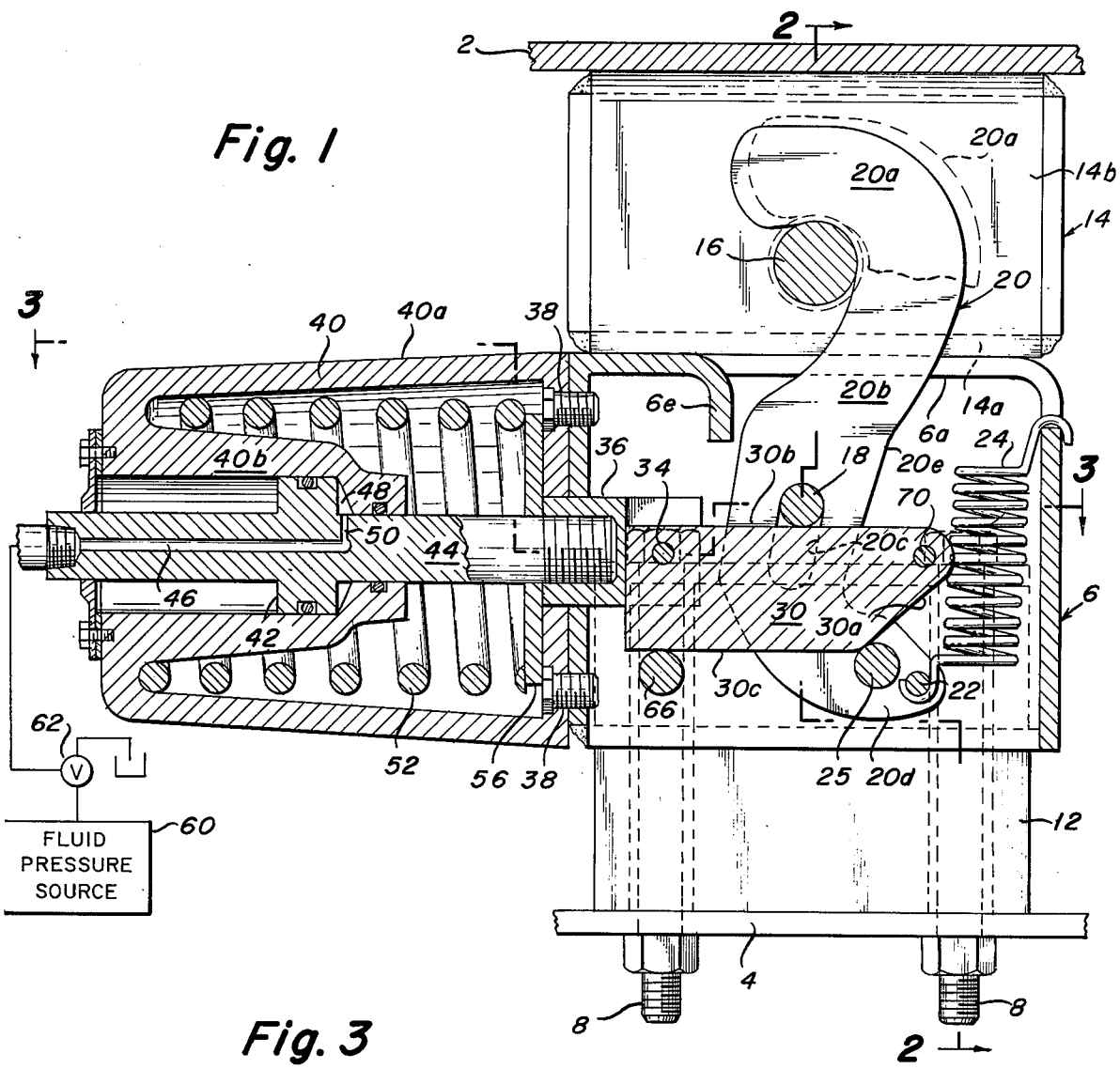
FIG. 1 is a central longitudinal sectional view of the preferred embodiment of the present invention including piston and cylinder motor actuating means, the hook and cam members being illustrated in their locked and locking positions, respectively.
Figure 3:
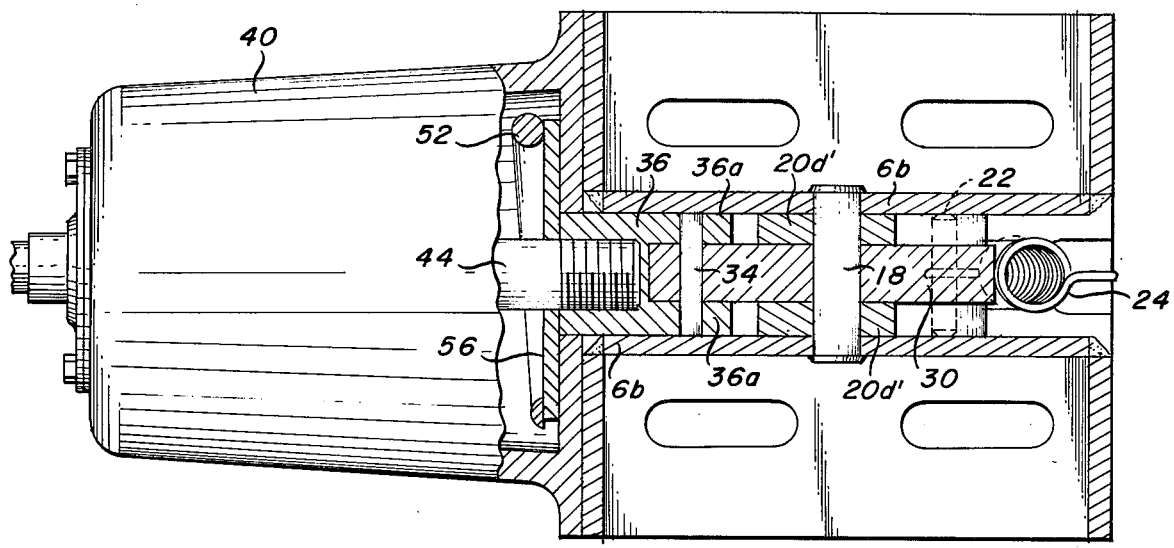
FIGS. 2 and 3 are sectional views taken along lines 2—2 and 3—3 of FIG. 1, respectively.
Figure 2:
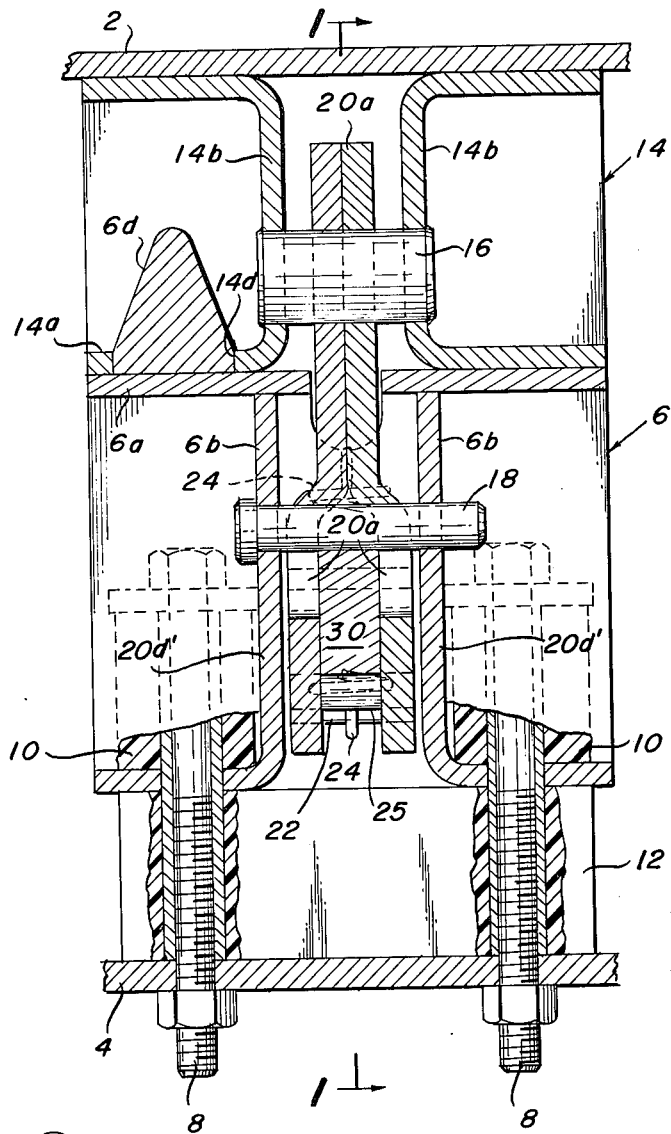

Referring first more particularly to FIGS. 1-3, the locking means of the present invention is adapted to connect the pivotable tilt cab 2 of the vehicle to the vehicle chassis 4. The locking mechanism includes a hook housing 6 that is bolted to the vehicle chassis 4 by means of bolts 8 and resilient cushion devices 10 and 12, as is known in the art, and a locking pin housing 14 that is secured to the tilt cab 2. These housings have parallel adjacent horizontal wall portions 6a to 14a, respectively, that are in contiguous abutting engagement when the tilt cab 2 is in the illustrated lowered position. Connected between the longitudinally extending laterally-spaced web portions 14b of the pin housing 14 is a stationary locking pin 16. Similarly, rigidly connected between the longitudinally extending laterally-spaced web portions 6b of the hook housing 6 is a pivot pin 18 that is parallel with the locking pin 16. Mounted for both axial and pivotal displacement about the pivot pin 18 is a hook member 20. More particularly, the hook member 20 has at one end a hook portion 20a adapted for locking cooperation with the locking pin 16, and an intermediate portion 20b that contains a longitudinally extending slot 20c that receives the pivot pin 18, and an end portion 20d remote from the hook portion 20a. As shown in FIG. 2, the hook member 20 may be formed from two metal elements that are secured together to define at their lower end a pair of parallel spaced leg portions 20d'. Connected between the spaced legs 20d' is a first pin 22 to which is connected one end of the helical tension spring 24. The other end of the tension spring 24 is connected with the hook housing 6 in a manner to bias the hook member both axially upwardly relative to the pivot pin 18 and pivotally in the counterclockwise direction about pivot pin 18 toward the locking pin 16. Also connected between the spaced legs portions 20d' is a cam follower pin 25.

Connected for linear displacement relative to the hook housing 6 in a direction parallel with the adjacent parallel housing walls 6a and 14a is a cam member 30. As shown in FIG. 2, the cam member 30 extends in sliding relation between the spaced leg portions 20d' of the hook member 20. At one end, the cam member 30 has an inclined cam surface 30a against which the cam follower pin 25 on the hook member 20 is biased by the first spring 24. At its other end, the cam member 30 is connected by connecting pin 34 between the parallel spaced leg portions 36a of a connecting member 36, as shown in FIG. 3. In the illustrated embodiment, operating means of the hydraulic piston motor type are provided for effecting linear displacement of the cam member 30 in a direction parallel with the adjacent housing walls 6a to 14a More particularly, there is bolted to the hook housing 6 by means of bolts 38 an actuator housing 40 having an outer tubular wall portion 40a, and an inner tubular wall portion 40b extending in concentrically spaced relation within the outer tubular wall portion 40a. The inner tubular wall portion 40b defines the cylinder of piston motor means including a piston member 42 that is mounted between the ends of a piston rod 44. At one end, the piston rod 44 is threadably connected with the connector member 36 as shown in FIG. 1, and the other end of the piston rod contains a longitudinal bore 46 that communicates with the working chamber 48 of the piston motor means via radial passages 50. Compression spring 52 is arranged concentrically about the inner tubular portion 40b, one end of the spring abutting the end wall of the housing 40, and the other end portion of the spring 52 being in engagement with the spring plate 56 that is carried by the piston rod 44 in abutting relationship with the connecting member 36. Consequently, the second spring 52 normally biases to the right the piston rod 44, piston 42, spring plate 56, connector 36, and the cam member 30. The longitudinal bore 46 contained in the piston rod 44 is connected with the source of pressure fluid 60 via control valve 62.

In accordance with an important feature of the present invention, the cam member 30 is supported by guide means throughout the entire extent of its linear displacement. More particularly, the cam member 30 has parallel upper and lower edge surfaces 30b and 30c that engage the pivot pin 18 and a stationary guide pin 66, respectively. Consequently, the guiding support means 18 and 36 prevent undesirable lateral forces from being applied to the piston rod 44 of the cam operating means.

Extending transversely through and protruding at opposite ends from the cam member 30 is a second cam follower member 70 that is adapted to engage cam surfaces 20e defined on the edge surfaces of the leg portions 20d' of the hook member remote from the cam operating means.

Mounted on the top wall 6a of the hook housing 6 is an upwardly extending guide projection 6d that is adapted to extend through a corresponding opening 14d contained in the bottom wall 14a of the pin housing 14 (as shown in FIG. 2). The top wall 6a of the hook housing 6 has a downwardly bent projection 6e as shown in FIG. 1 that defines a stop for limiting the extent of counterclockwise pivotal movement of the hook member 20 about the pivot pin 18.

OPERATION

In operation, when the valve member 62 is closed, the cam member 30 is biased to the right by the compression spring 52, whereupon cam follower 25 on the hook member 20 is engaged by the cam surface 30a on the cam member 30 to maintain the hook member 20 downwardly in the illustrated locked position against the biasing force of the first spring 24. The hook portion 20a is thus in locked engagement with the locking pin 16 to firmly connect the pin housing 14 and the tilt cab 2 to the hook housing 6 and the chassis frame 4.

Figure 4:
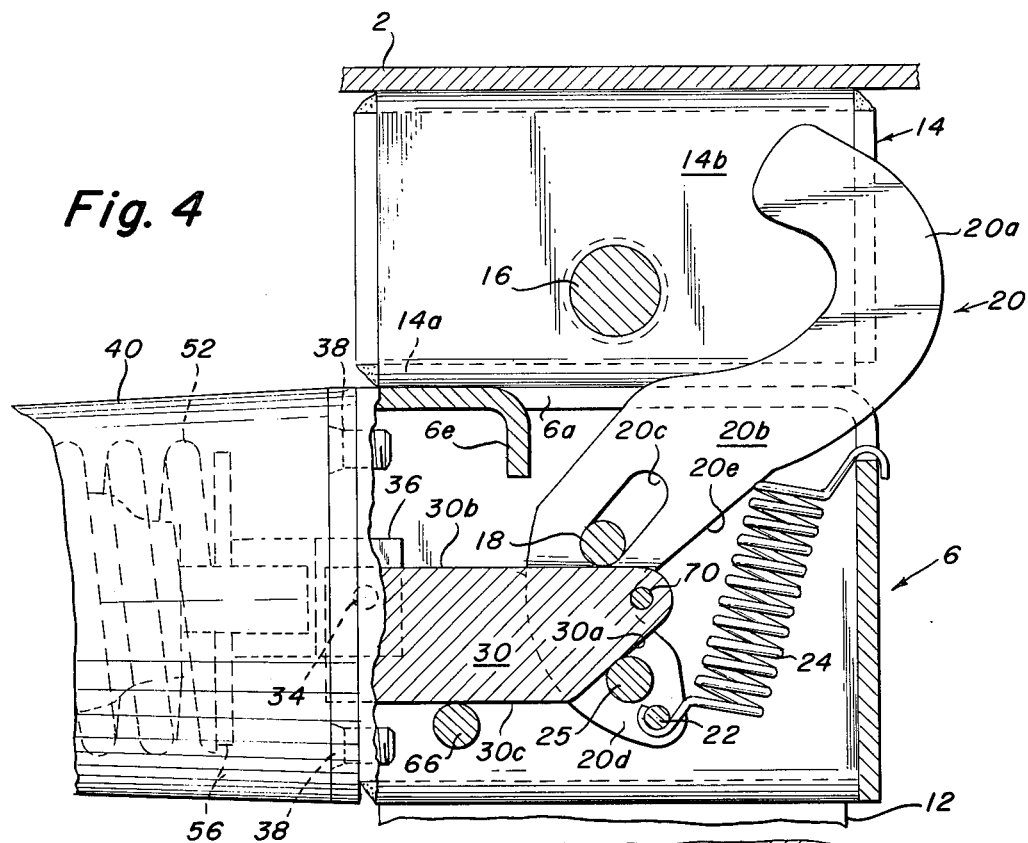
FIG. 4 is a detailed view corresponding to FIG. 1, the hook member being illustrated in the fully released position.

When the valve 62 is opened, pressure fluid from the source 60 is supplied to the working chamber 48 of the piston and cylinder motor means via longitudinal passage 46 contained in the piston rod 44, and the radial passage 50. Consequently, piston 42, piston rod 44, connector 36, and cam 30 are shifted toward the left, whereupon the cam follower 25 rides upwardly upon the cam surface 30a, owing to the biasing force applied to the hook member 20 by the first spring 24. Thus, the hook member 20 is displaced upwardly to the safety position illustrated by the chain link lines in FIG. 1, whereupon the hook portion 20a of the hook member is spaced slightly from the locking pin 16. As the cam member 30 is shifted further to the left, the cam follower 70 on the cam member 30 engages the corresponding cam surface 20e on the leg portions 20d' of the hook member, whereupon the hook member is pivoted about pivot pin 18 toward the fully released position illustrated in FIG. 4. The tilt cab 2 may now be pivoted upwardly to effect separation between the hook housing 6 and the pin housing 14 as shown in FIG. 5.

In the event that the tilt cab is returned to its illustrated lowered position of FIGS. 1–4, valve member 62 is operated to vent the working chamber 48 of the piston motor means to sump, whereupon spring 52 causes piston rod 44, piston 42, spring plate 56, connector 36, and cam 30 to be displaced to the right toward the locking position illustrated in FIG. 1. Thus, as the second cam follower 70 is shifted to the right, the hook member 20 is pivoted in the counterclockwise direction by the spring 24 toward the safety position illustrated in FIG. 1, and upon further movement of the cam member 30 toward the illustrated locking position, cam surface 30a engages the cam follower 25 to axially displace the hook member 20 downwardly from the safety position toward the locked position illustrated in FIG. 1. During the linear displacement of the cam member 30, it is supported in guided relationship between the stationary pivot pin 18 and the support pin 66 which are rigidly secured to the hook housing 6. Thus the application of undesirable lateral forces upon the cam member operating means is avoided.

Figure 5:
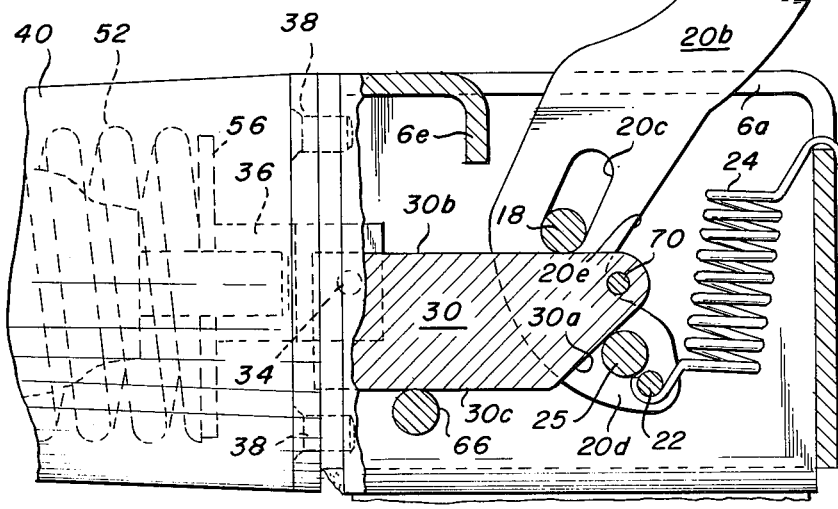
FIG. 5 is a detailed view corresponding to FIG. 4, the hook member being illustrated in the jammed condition.

It will be apparent from FIG. 5 that in the event that the hook member 20 is in a jammed condition owing to the engagement with the end surface of the hook portion 20a with the locking pin 16, the cam member is prevented from being shifted to the right by the compression spring 52, owing to the cooperation between the cam follower 25 on the hook member and the cam surface 30a on the cam member. Consequently, the transmission of undesirable lateral load forces on the cam operating means is avoided.

Figure 6:
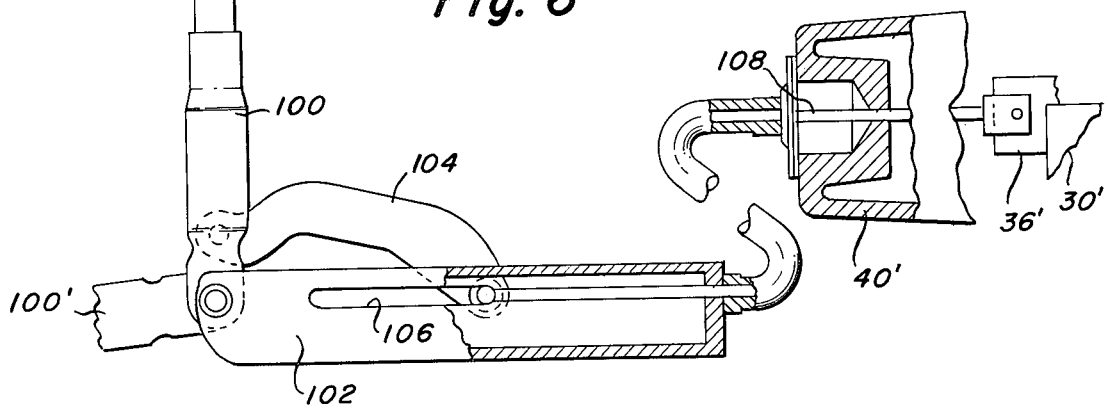
FIG. 6 is a detailed view illustrating an alternate embodiment of the invention including manually operable lever and cable means for operating the cam plate between its locking and releasing positions.

Referring now the alternate embodiment of FIG. 6, the cam operating means may be of the manually operable type including a lever 100 that is totally connected with a housing 102 that is secured to the chassis frame. Connecting link 104 is pivotally connected at one end with the lever 100 and at the other end is connected for sliding movement relative to a longitudinal slot 106 contained in the housing 102. The connecting link is also connected at its free end with the connecting member 36' by means of a flexible cable 108 that is guided for axial movement within the actuator housing 40'. Consequently, the cam member 30' may be linearly displaced between its locking and releasing positions merely by pivoting lever 100 between its illustrated locking and releasing positions.

Referring now to the embodiment of FIGS. 7–12, it will be seen that the upper pin housing 114 has a centrally arranged downwardly extending male portion 114a that is adapted to extend within a corresponding recess 106a contained in the upper surface of the hook housing 106, thereby assuring proper positioning of the housings when they are in their abutting contiguous condition. In this embodiment, the cam plate 130 is pivotally connected with the piston rod 144 by means of horizontal pivot 134, the other end of the cam plate being pivotally connected with the lower end of the hook member 120 by means of pivot pin 135 and slot 130a. Tension spring 124 normally biases the locking pin 120 in the counterclockwise direction about pivot pin 118 toward the locking position relative to the locking pin 116. In this embodiment, a pawl 170 is pivotally connected with the hook housing 106 about pivot pin 171, said pawl being biased in the counterclockwise direction by spring member 172 to effect engagement between the pawl nose portion 170a and a tooth portion 130b on the cam member 130 as will be described in greater detail below.

Figure 7:
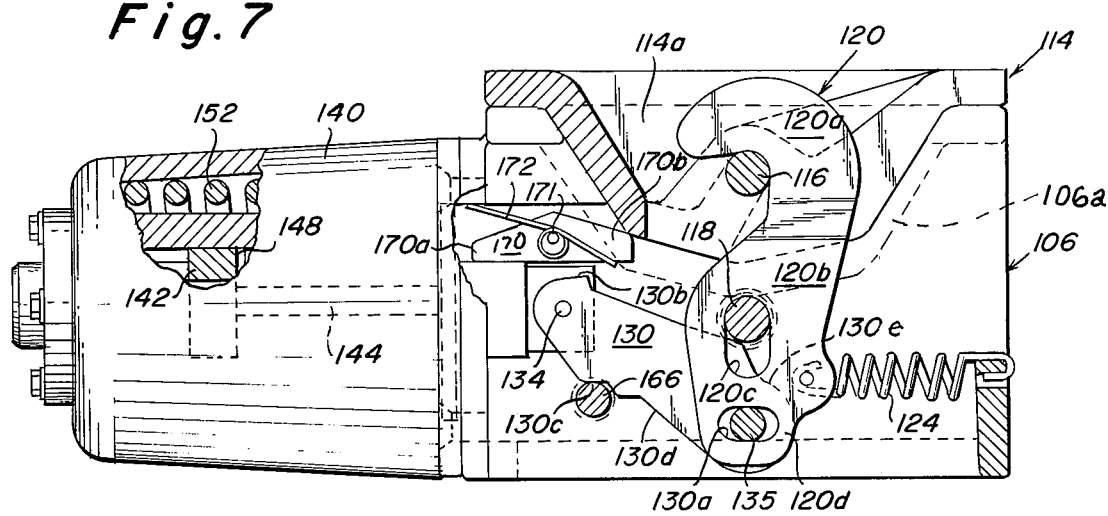
FIGS. 7-9 are central longitudinal section, top plane, and right hand end views, respectively, of a second embodiment of the invention with the hook and cam members being illustrated in their locked and locking positions, respectively.
Figure 8:
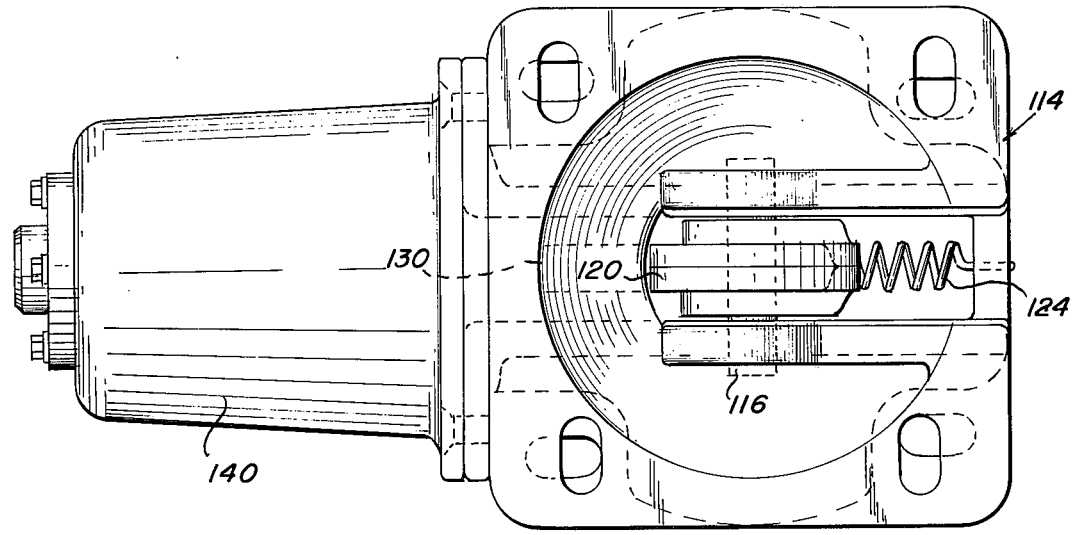
Figure 9:
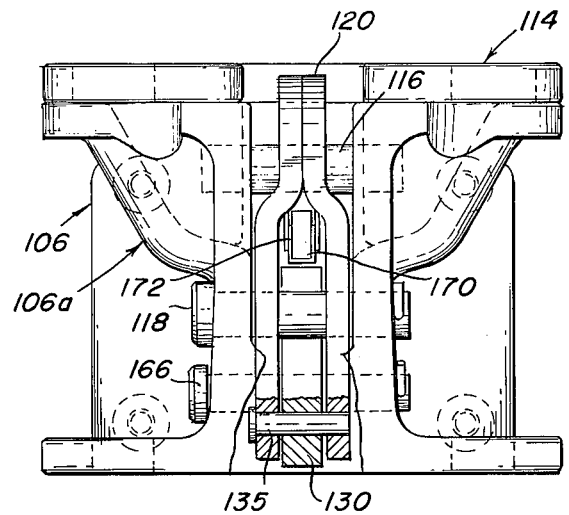
Figure 10:
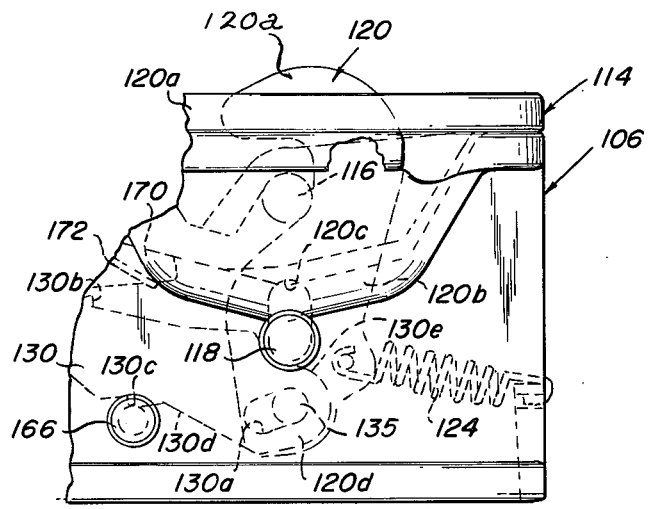
FIG. 10 is a detailed view illustrating the hook and cam members of FIG. 7 in their safety positions.
Figure 11:
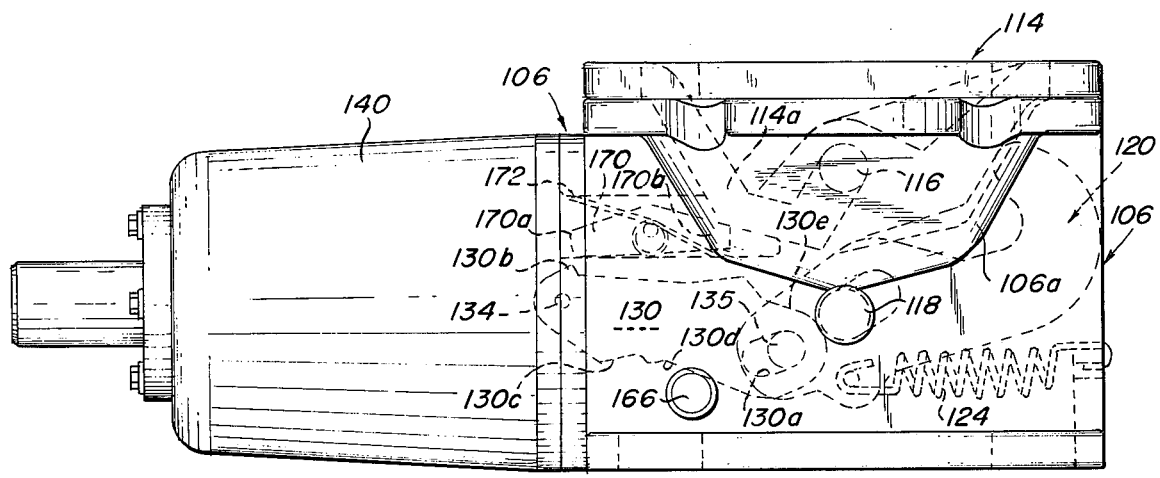
FIG. 11 is a sectional view illustrating the hook and cam members in their released and releasing positions, respectively, the pawl means being in the unlocked condition.

When the cam member 130 is in the locking position illustrated in FIG. 7 (causing the hook member 120 to be in the locked position relative to locking pin 116), a first cam surface 130c on the cam member is in engagement with the stationary cam follower 166 secured to the hook housing 106. Consequently, when pressure fluid is supplied to the working chamber 148 of the piston and cylinder motor means, piston 142, piston rod 144, and pivot pin 134 are displaced to the left, whereupon cam member 130 is pivoted upwardly from its locking position of FIG. 7 toward its safety position of FIG. 10 by the cooperation between the first cam surface 130c and the stationary cam follower 166. Owing to the cooperation between pivot pin 135 and slot 130a, the hook member 120 is elevated toward its illustrated (FIG. 10) safety position. Upon further displacement of piston 142, piston rod 144 and pivot pin 134 to the left, a second cam surface 130d on the cam plate 130 engages the stationary cam follower 166 to elevate the cam member 130 and to pivot the hook member 120 (owing to the cooperation between pivot pin 135 and slot 130a) from the safety position toward the fully released position illustrated in FIG. 11. Owing to the cooperation between the free end portion 170b and the male portion 114a of the hook housing 114, the pawl member 170 is maintained in its disengaged condition against the force of spring means 172, as illustrated in FIG. 11. Upon separation of the pin housing 114 from the hook housing 106 as shown in FIG. 12, the pawl member 170 is released and is rotated in the counterclockwise direction by spring 172 to effect locking engagement between the pawl nose portion 170a and the cam tooth 130b, thereby locking the cam plate 130 in its releasing position illustrated in FIG. 12.

Figure 12:
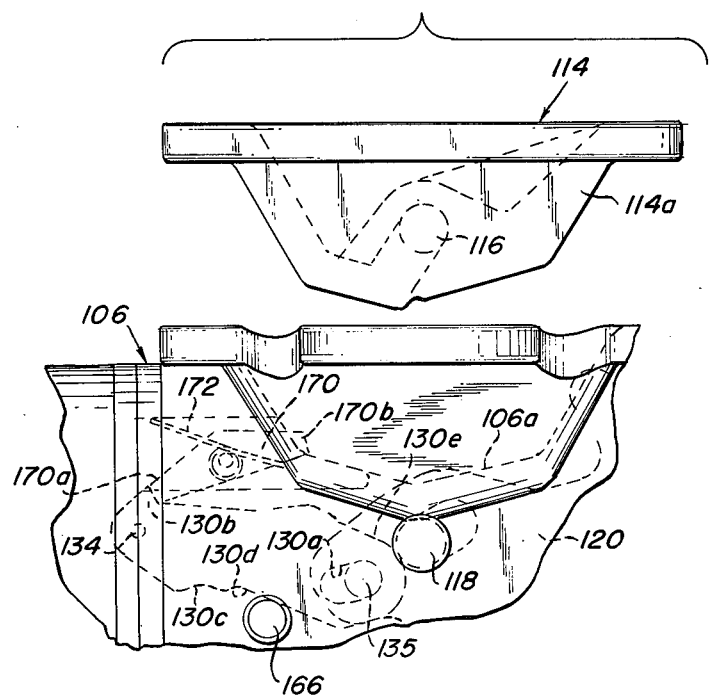
FIG. 12 is a detailed view illustrating the hook and cam members in their released and releasing positions, respectively, the pawl means being illustrated in the locked condition with the pin and hook housings separated.

In the event that pressure fluid is released from the working chamber 148, the piston rod 144 and pivot pin 136 are biased to the right by the spring 152, but owing to the locking cooperation between pawl 170 and cam tooth 130b, the cam member 130 is retained in its releasing position illustrated in FIG. 12.

In the event that the upper pin housing 114 is again seated on the lower hook housing 106 with the male portion 114a in mating engagement within the recess 106a, the pawl 170 is pivoted in the clockwise toward its unlocked position, whereupon spring 152 biases piston 144 and pivot pin 134 to the right, thereby pivoting the hook member 120 from its fully released position toward its safety position. At this time, a third cam surface 130e on the cam plate 130 engages the pivot pin 118 to pivot the cam plate 130 downwardly in the clockwise direction about pivot pin 134, thereby by axially displacing the hook member 120 downwardly from the safety position of FIG. 10 toward the locked position of FIG. 7. The cam plate 130 is thus returned to the locking position illustrated in FIG. 7, the hook member 120 is in its locked condition relative to the locking pin 116, and the pawl means 170 are maintained in the unlocked condition as a consequence of the cooperation between male portion 114a of the pin housing 114, and the free end 170b of the pawl member.

While in accordance with the provisions of the Patent Statutes, the preferred forms and embodiments of the invention have been illustrated and described, it will be apparent to those skilled in the art various changes and modifications may be made without deviating from the inventive concepts set forth above.

What is claimed is:

1. Apparatus for locking together a pair of components, such as the tilt cab chassis components of a motor vehicle, comprising
   (a) a pin housing adapted for connection with one of said components;
   (b) a hook housing adapted for connection with the other of said components, said pin and hook housings including adjacent parallel walls which are in abutting engagement when the components are positioned for connection, said pin housing containing a stationary transverse locking pin parallel with said housing walls, said hook housing containing a stationary pivot pin parallel with said locking pin;
   (c) a hook member mounted for both axial and pivotal displacement on said pivot pin, said hook member including at one end a hook portion adapted for locking engagement with said locking pin, said hook member being axially displaceable from a normal locking position in which said hook portion is in engagement with said locking pin toward a safety position in which said hook portion is opposite and spaced from said locking pin, said hook member being pivotably displaceable from said safety position to a fully released position relative to said locking pin, thereby to permit separation of the components;
   (d) means including first spring means connected between said hook member and said hook housing for pivotally biasing said hook member in the hook-locking direction relative to said locking pin;
   (e) cam means including a cam member operable between locking, safety and releasing positions relative to said hook housing for operating said hook member between its locked, safety and released positions, respectively;
   (f) second spring means biasing said cam member toward the locking position; and
   (g) linearly operable cam operating means for displacing said cam member from the locking position successively toward the safety and releasing positions against the biasing force of said second spring means.

2. Apparatus as defined in claim 1, wherein said hook member contains a longitudinal slot receiving said pivot pin, thereby to permit axial displacement of said hook member between the locked and safety positions relative to said locking pin.

3. Apparatus as defined in claim 2, wherein said cam operating means comprises piston and cylinder actuator means.

4. Apparatus as defined in claim 2, wherein said cam operating means comprises mechanical toggle lever and cable actuator means.

5. Apparatus as defined in claim 2, wherein said cam member comprises a cam plate contained in a plane normal to said pivot and locking pins, said cam plate being connected at one end with said cam operating means for longitudinal displacement in a direction generally parallel with said adjacent parallel housing walls.

6. Apparatus as defined in claim 5, wherein said cam member is linearly displaceable by said cam operating means throughout the length of its travel between said locking, safety and releasing positions.

7. Apparatus as defined in claim 5, wherein said hook member is pivotally connected with said cam plate; wherein said cam plate is pivotally connected with said means for pivotal movement about a pivot axis parallel with said pivot and locking pins; and further wherein said cam plate is linearly displaceable by said actuator means between said safety and releasing positions, and pivotally displaceable by said actuator means between said safety and locking positions.

8. Apparatus as defined in claim 6, wherein said longitudinal slot for receiving said pivot pin is contained in an intermediate portion of said hook member; wherein said first spring means is connected between said hook member and said hook housing for axially biasing said hook member from its locked position toward its safety position; and further wherein said cam plate includes a first cam surface on the end thereof remote from said cam operating means, said hook member including on the end thereof remote from said hook portion a first cam follower adapted to engage said first cam surface, said first cam surface and said first cam follower being so arranged as to effect axial displacement of said hook member from the safety position to the locked position against the biasing force of said first spring means as the cam plate is linearly displaced from its safety position toward the locking position.

9. Apparatus as defined in claim 8, wherein said hook member remote end includes on the side thereof remote from said cam operating means a second cam surface, and further wherein said cam plate includes a second cam follower adapted to engage said second cam surface, said second cam follower being so arranged that as said cam plate is displaced from the safety position toward the releasing position, said hook member is pivoted toward the fully released position relative to said locking pin.

10. Apparatus as defined in claim 6, and further including stationary support means connected with said hook housing for supporting said cam plate throughout the length of its linear travel, between said locking, safety and releasing positions, thereby to prevent undesirable side loading of said cam plate and said cam operating means.

11. Apparatus as defined in claim 10, wherein said cam plate includes opposed edge surfaces parallel with said adjacent parallel housing walls, one of said cam plate edge surfaces being in sliding engagement with said pivot pin, to define a first portion of said stationary support means, and a stationary support pin connected with said hook housing for continuous sliding engagement with the other edge surface of said cam plate, thereby to define a second portion of said stationary support means.

12. Apparatus as defined in claim 7, wherein said hook member is pivotally connected with the end of said cam plate remote from said cam operating means; and further including first stationary cam follower means connected with said hook housing for cooperation with a first cam surface intermediate the ends of said cam plate for pivoting said cam plate from the locking position toward the releasing position when said cam plate is displaced by said cam operating means against the biasing force of said second spring means.

13. Apparatus as defined in claim 12, wherein said cam plate includes on the side thereof opposite from said first cam surface a second cam surface that cooperates with said pivot pin to pivot the cam plate from the safety position toward the locking position when said cam plate is displaced by the biasing force of said second spring means.

14. Apparatus as defined in claim 13, and further including pawl means connnected with said hook housing for cooperation with a tooth arranged on said cam member for normally locking said cam member in its releasing position.

15. Apparatus as defined in claim 14, wherein the adjacent parallel walls of said pin and hook housings are contoured to define mating male and female surfaces, respectively; and further wherein said pawl means is operable to its normal locking condition only when said pin and hook housings are separated, said pawl means being operable to the unlocked condition when the pin and hook housings are adjacent each other with the mating surfaces thereof in contiguous engagement.

16. Apparatus as defined in claim 1, and further including pawl means for locking said cam member in its releasing position when said pin and hook housings are separated, said pawl means being automatically operated to an unlocked condition relative to said cam member when said pin and hook housings are returned to adjacent contiguous positions.

* * * * *